United States Patent
van Vuuren et al.

(10) Patent No.: US 9,689,293 B2
(45) Date of Patent: Jun. 27, 2017

(54) REDUCTANT DELIVERY UNIT FOR AUTOMOTIVE SELECTIVE CATALYTIC REDUCTION WITH OPTIMIZED FLUID HEATING

(71) Applicant: Continental Automotive Systems, Inc., Auburn Hills, MI (US)

(72) Inventors: Willem Nicolaas van Vuuren, Newport News, VA (US); Stephen C Bugos, Newport News, VA (US); Michael J Hornby, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/817,993

(22) Filed: Aug. 4, 2015

(65) Prior Publication Data

US 2016/0053652 A1 Feb. 25, 2016

Related U.S. Application Data

(60) Provisional application No. 62/039,115, filed on Aug. 19, 2014.

(51) Int. Cl.
*F02M 53/06* (2006.01)
*F01N 3/20* (2006.01)

(52) U.S. Cl.
CPC ........ *F01N 3/2066* (2013.01); *F01N 2570/14* (2013.01); *F01N 2610/02* (2013.01);
(Continued)

(58) Field of Classification Search
CPC ........ F01N 2610/10; F01N 2610/1453; F02M 53/02; F02M 53/06; F02M 2700/077
See application file for complete search history.

(56) References Cited

U.S. PATENT DOCUMENTS

| | | | |
|---|---|---|---|
| 2002/0139871 A1* | 10/2002 | Hokao | F02M 51/0682 239/585.1 |
| 2005/0263136 A1 | 12/2005 | Rigney | |
| 2010/0047144 A1* | 2/2010 | Hammer | B01D 53/9418 423/213.5 |

FOREIGN PATENT DOCUMENTS

| | | |
|---|---|---|
| JP | 2003-049737 A | 2/2003 |
| JP | 2004-324502 A | 11/2004 |

(Continued)

OTHER PUBLICATIONS

Machine translation of JP2004324502A, accessed on Sep. 29, 2016.*

(Continued)

*Primary Examiner* — Jonathan Matthias

(57) ABSTRACT

A reductant delivery unit reduces nitrogen oxide (NOx) emissions from a vehicle. The delivery unit includes a solenoid operated fluid injector having a fluid inlet and a fluid outlet. The inlet receives a source of reducing agent and the outlet communicates with an exhaust gas flow path of the vehicle so that the fluid injector controls injection of the reducing agent into the exhaust gas flow path. The fluid injector has an inlet tube for directing the reducing agent between the inlet and the outlet. A coil heater is integral with the fluid injector and is constructed and arranged, when energized, to inductively heat the inlet tube and thus at least a portion of the reducing agent so that an unheated volume, of the reducing agent in the inlet tube, which is adjacent to the fluid outlet, is less than about 100 mm$^3$.

18 Claims, 5 Drawing Sheets

(52) U.S. Cl.
CPC ...... *F01N 2610/03* (2013.01); *F01N 2610/10* (2013.01); *F01N 2610/1453* (2013.01)

(56) References Cited

FOREIGN PATENT DOCUMENTS

| JP | 2005538311 | | 12/2005 |
| JP | 3888518 | B2 | 12/2006 |
| JP | 2010-514545 | A | 5/2010 |
| JP | 2014-506182 | A | 3/2014 |
| WO | 2012/104894 | A1 | 8/2012 |

OTHER PUBLICATIONS

The Korean Intellectual Property Office Office Action dated Oct. 4, 2016 for corresponding KR patent application No. 10-2015-0114048.

The Japan Intellectual Property Office, Office Action dated Dec. 20, 2016 for corresponding JP patent application No. 2015-161852.

\* cited by examiner

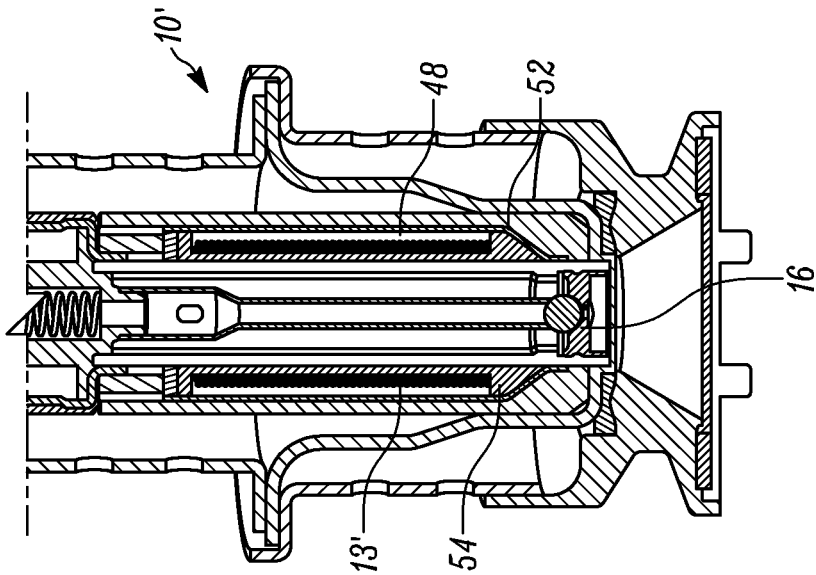
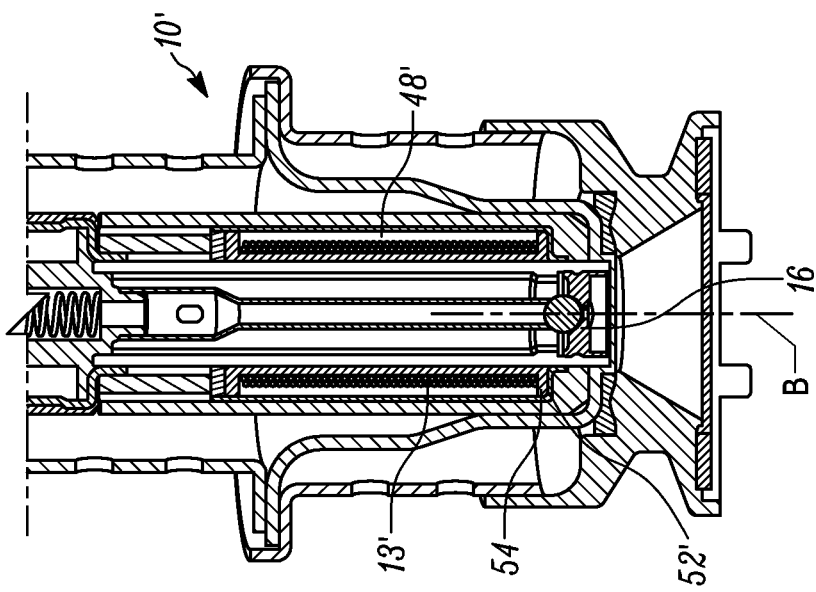

REDUCTANT DELIVERY UNIT FOR AUTOMOTIVE SELECTIVE CATALYTIC REDUCTION WITH OPTIMIZED FLUID HEATING

CROSS-REFERENCE TO RELATED APPLICATION

This application claims priority to U.S. Provisional Application No. 62/039,115, which was filed on Aug. 19, 2014, titled "Reductant Delivery Unit for Automotive Selective Catalytic Reduction with Optimized Fluid Heating."

FIELD

The invention relates to a reductant delivery unit (RDU) that supplies reducing agent to an engine exhaust system and, more particularly, to an RDU that directly heats substantially an entire volume of the reducing agent just prior to injection.

BACKGROUND

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution ($CO(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide (CO2). The ammonia resulting from the thermolysis and the hydrolysis then undergoes a catalyzed reaction with the nitrogen oxides as described previously.

In today's production systems, the RDU is typically mounted under the body of the vehicle, in a downstream location on the exhaust line. This results in relatively low temperatures at the SCR catalyst, longer light-off times, and low conversion efficiency of the $NO_x$. The lower exhaust temperatures (lower enthalpy) also inhibit the thermal decomposition of the urea thermolysis reaction, or in the case of the thermolysis HNCO byproduct, the low temperatures also inhibit the hydrolysis reaction. The result is the presence of excessive urea and/or HNCO at the SCR catalyst and an insufficient quantity of ammonia to participate in the NOx reduction reactions. A good example of this situation was presented in SAE 2007-01-1582: "Laboratory and Engine Study of Urea-Related Deposits in Diesel Urea-SCR After-Treatment Systems". Engine dynamometer data from this study shows that at exhaust temperatures below 300° C., a measurable proportion of the injected urea remains untransformed into either HNCO or NH3.

There are also activities in the industry examining the potential of alternative reducing agents. Some of these agents (e.g., Guanidinium Formate) exhibit higher decomposition temperatures than those of urea. In order for these alternatives to be viable, they require preheating, typically in a dedicated reformer located in a bypass flow passage off the main exhaust. A description of one such approach is provided in in SAE 2012-01-1078, "Development of a 3rd Generation SCR NH3-Direct Dosing System for Highly Efficient DeNOx". During the startup phase, these reformer concepts typically rely on electrical heating of the bypass gas flow and the use of hydrolysis reaction catalysts to ensure the proper conditions for transformation of the carriers into ammonia.

With reference to FIG. 1, a conventional RDU 10 is shown, generally indicated at 10, having a fluid injector 12. The injector 12 is for use in delivering fluid, such as urea solution and employs an inductive coil heater 13 with the goal to transfer heat from the coil heater 13 to an inlet tube 14 of the injector 10 and to the fluid. With reference to FIG. 2, however, due to limitations imposed by the installation of a port fuel injector in a cylinder head or intake manifold, the coil heater 13 does not extend down fully to the tip or exit 16 of the injector 12. The result is a magnetic flux path, indicated by arrows A in FIG. 2, that is limited in extent and which induces heating that terminates 6-8 mm above the metering point or exit 16 of the injector 12. The result is an unheated volume V of fluid of 213 $mm^3$ that does not benefit from a direct heating path to the inductive heat source (coil 13). This volume V needs to be evacuated before heated fluid is able to be ejected—at a flow rate of 5.2 mg/s (a typical flow rate during a vehicle cold start on emissions test cycles), it would theoretically require a minimum of 45 seconds to remove this unheated fluid. In urea injection applications where cold start activity is required, this delay reduces the effectiveness of the system to start reducing the engine-out NOx emissions.

Thus, there is a need to directly heat a reducing agent in an injector closer to the metering point to ensure a more efficient heat transfer and produce the desired reducing agent temperature so as to reduce the time required to remove unheated reducing agent.

SUMMARY

An object of the invention is to fulfill the needs referred to above. In accordance with the principles of the present invention, this objective is obtained by providing a reductant delivery unit for reducing nitrogen oxide (NOx) emissions from a vehicle. The reductant delivery unit includes a solenoid operated fluid injector having a fluid inlet and a fluid outlet. The fluid inlet is constructed and arranged to receive a source of reducing agent and the fluid outlet being constructed and arranged to communicate with an exhaust gas flow path of the vehicle so that the fluid injector controls injection of the reducing agent into the exhaust gas flow path. The fluid injector has an inlet tube for directing the reducing agent between the fluid inlet and the fluid outlet. A coil heater is integral with the fluid injector and is constructed and arranged, when energized, to inductively heat the inlet tube to thereby heat the reducing agent within the inlet tube. A coil heater housing surrounds a portion of the coil heater. An overmold structure overmolds the coil heater housing. An injector housing covers at least a portion of the overmold structure and is constructed and arranged to be in sealing relation with the overmold structure, absent an O-ring, so that an end of the coil heater is disposed generally adjacent to the fluid outlet of the injector.

In accordance with another aspect of a disclosed embodiment, a method delivers a reducing agent for reducing nitrogen oxide (NOx) emissions from a vehicle. The method associates a solenoid operated fluid injector with the exhaust gas flow path. The fluid injector has a fluid inlet and a fluid outlet. The fluid inlet receives a source of reducing agent. The fluid outlet communicates with the exhaust gas flow path. The fluid injector has an inlet tube for directing the reducing agent between the fluid inlet and the fluid outlet. At least a portion of the reducing agent is heated while within the inlet tube so that an unheated volume, of the reducing agent in the inlet tube, which is adjacent to the fluid outlet, is less than about 100 mm$^3$. The fluid injector is operated to inject the reducing agent into the exhaust gas flow path.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 5 is a view of the lower portion of an RDU in accordance with another embodiment.

FIG. 6 is a view of the lower portion of the RDU of FIG. 3.

DETAILED DESCRIPTION OF EXEMPLARY EMBODIMENTS

Figure 3:
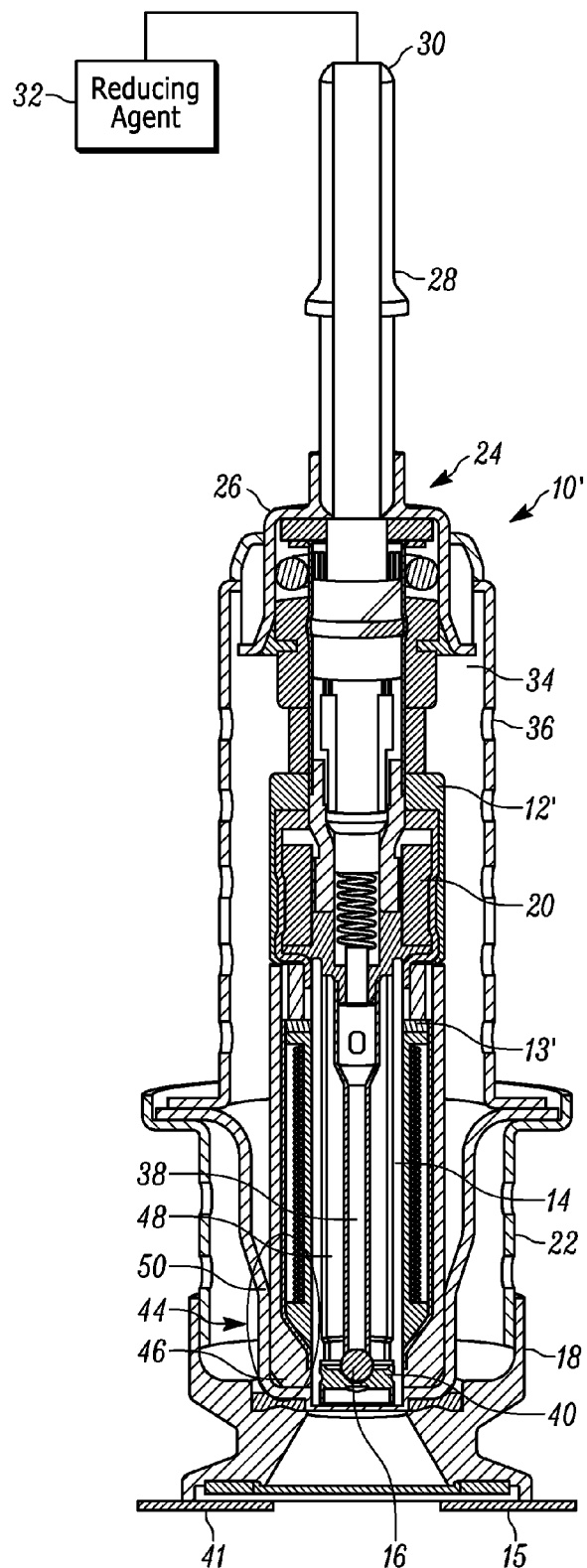
FIG. 3 is a cross-sectional view of an RDU including a fluid injector provided in accordance with an embodiment.

With reference to FIG. 3, an RDU is shown, generally indicated at 10', in accordance with an embodiment. The RDU 10' can be employed in a system of the type disclosed in U.S. Patent Application Publication No. 2008/0236147 A1, the contents of which is hereby incorporated by reference into this specification.

The RDU 10' includes a solenoid fluid injector 12' that provides a metering function of fluid and provides the spray preparation of the fluid into the exhaust gas flow path 15 of a vehicle in a dosing application for reducing nitrogen oxide (NOx) emissions from a vehicle. Thus, the fluid injector 12' is constructed and arranged to be associated with the exhaust gas flow path 15 upstream of a SCR catalytic converter in the conventional manner. The fluid injector 12' is preferably a gasoline, electrically operated, solenoid fuel injector such as the type disclosed in U.S. Pat. No. 6,685,112, the content of which is hereby incorporated by reference into this specification. Thus, a first electromagnetic coil 20 operates the fluid injector 12' in the conventional manner when energized.

The fluid injector 12' is disposed inside of an interior carrier 22. An inlet cup structure, generally indicated at 24, includes an inlet cup 26 and an inlet connector 28 integral with or coupled to the inlet cup 26. The inlet connector 28 defines the fluid inlet 30 of the injector 12'. The inlet connector 28 is typically in communication with a source of fluid reducing agent 32 such as urea solution that is fed to the injector 12' via the inlet tube 14 to be injected from the metering point 16 or fluid outlet of the injector 12. Thus, the inlet tube 14 directs urea solution between the fluid inlet 30 and the fluid outlet 16. The inlet tube 14 can also be considered a valve body.

An injector shield 34 is coupled to the injector carrier 22 so that the shield 34 is fixed with respect to the injector 12'. The shield 34 surrounds at least a portion of the injector 12' and isolates it from environmental factors such as sprayed gravel, high pressure water jets, splashes, etc. The shield 34 also provides structural support to the RDU 10'. Openings 36 are provided through the shield 34 for air cooling of the fluid injector 12'.

The urea solution 32 is fed through the inlet 30 and is delivered under pressure to the solenoid fluid injector 12'. The urea solution is metered and exits the injector 12' at metering point 16 in the conventional manner, due to movement of the solenoid operated valve 38 with respect to the seat 40. The RDU 10' is mounted to the exhaust system 41 with a flange 18, preferably with a V-clamp (not shown). Of course, other mounting methods can be used such as using bolts or other mechanical joining techniques.

Figure 1:
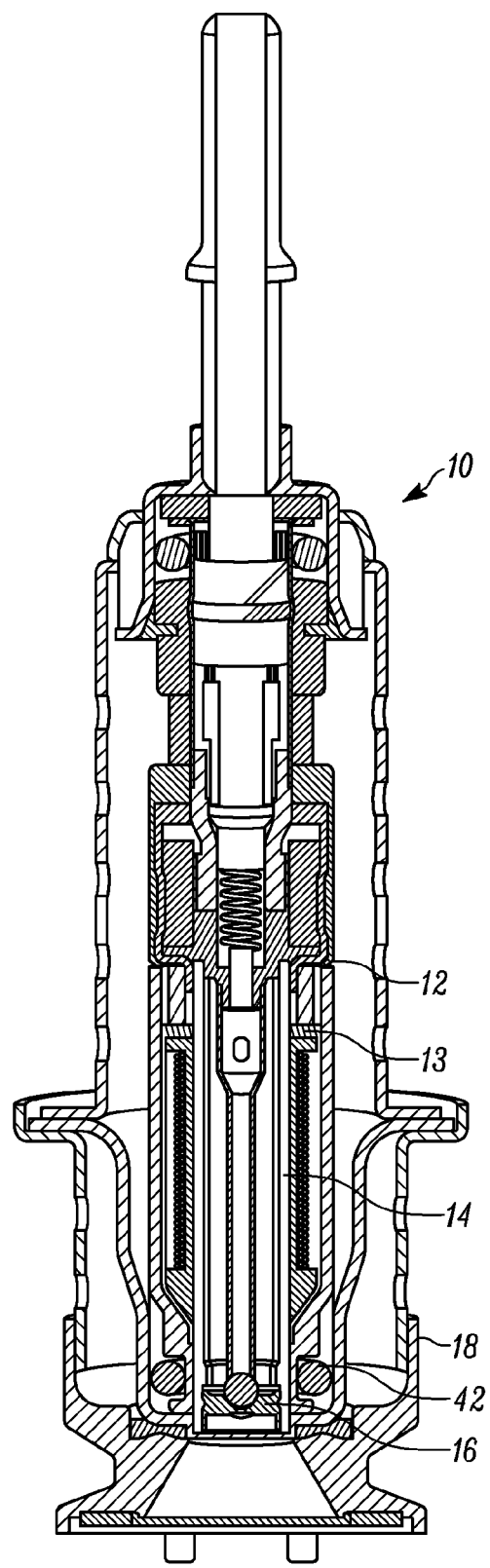
FIG. 1 is cross-sectional view of a conventional an RDU including a fluid injector.
Figure 2:
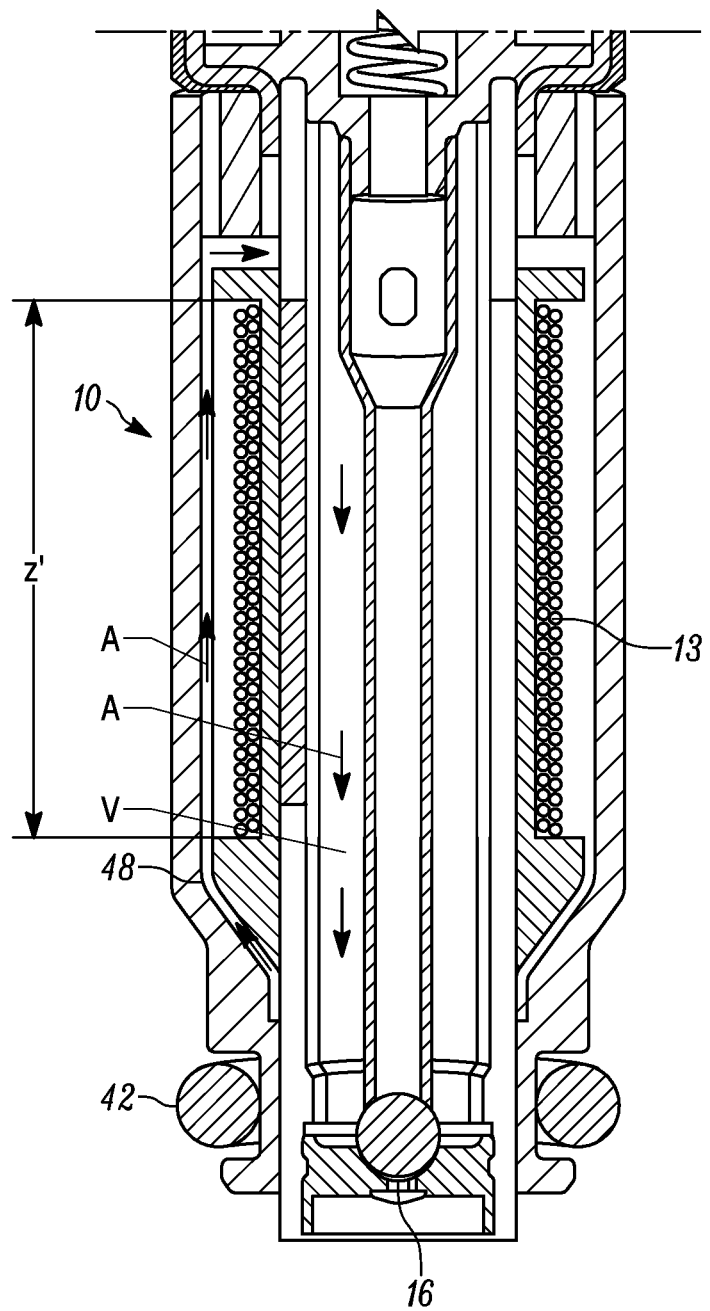
FIG. 2 is a view of lower portion of the injector of the conventional RDU of FIG. 1.
Figure 4:
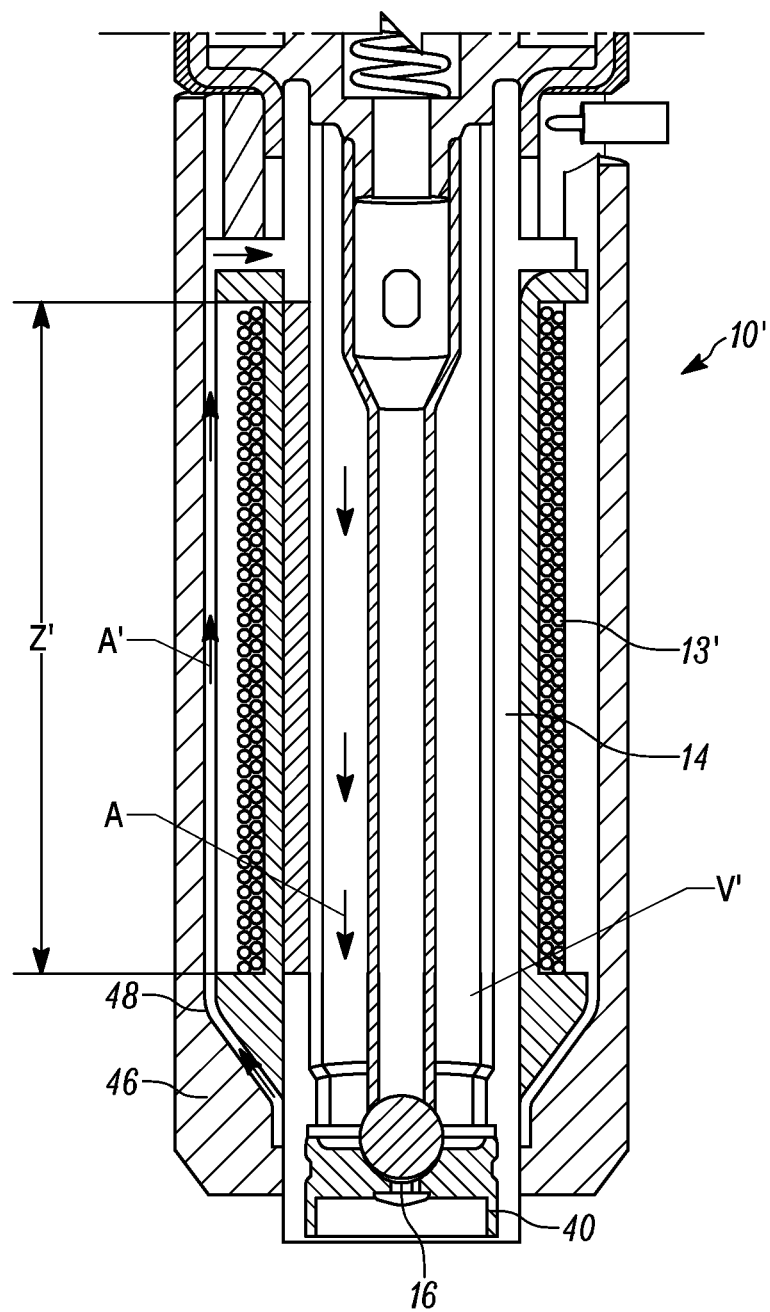
FIG. 4 is a view of lower portion of the injector of the RDU of FIG. 3.

To heat the urea solution upon demand and prior to injection, an inductive coil heater 13' is provided in the solenoid injector 12'. The inductive coil heater 13' is electrically operated via power applied to injector 10' and when energized, the coil heater 13' provides an electromagnetic field (see arrows A' in FIG. 4) to inductively heat the injector inlet tube 14 and thus heat the urea solution therein adjacent to heating zone Z'. With reference to FIGS. 2 and 4, in the embodiment, the coil heater 13' has been repositioned closer to the metering point 16 as compared to the conventional coil heater 13 of FIG. 2. Thus, the primary active heating zone Z' of the inlet tube 14 has also been repositioned toward the metering point 16. This results in a reduction of the "unheated" fluid volume V' by over 50%, with the volume V' being less than about 100 mm$^3$. Since more volume of the urea solution is heated just prior to injection, an earlier onset of injection after engine startup is possible, thereby reducing NOx emissions further.

The repositioning of the coil heater is permitted as a result of the functional analysis of the lower O-ring 42 of the conventional injector 10 (FIG. 2). In a port injection fuel system, for which the injectors 10 are intended, the lower O-ring 42 is required to provide intake air sealing of the intake manifold or cylinder head at the injector installation location. In the RDU application, this sealing function is no longer required so the O-ring 42 can be eliminated in the injector 10' of the embodiment. With reference to the encircled area 44 of FIG. 3, some minimal sealing is required to prevent the ingress of water and dirt. This sealing can be accomplished by the proposed change to overmold structure 46 that overmolds the coil heater housing 48, which surrounds a portion of the coil heater 13'. An injector housing 50 covers a portion of the overmold structure 46 and cooperates there-with so as to be in sealing relation with the overmold structure 46. It can be appreciated that should a more robust seal be required, a small cross-section O-ring could be implemented in a groove in the overmold structure 46 that would still allow for the repositioning of the coil heater 13'.

An advantage of the embodiment of FIG. 4 is that the geometry of the inner stamped coil heater housing 50 is unchanged from that of the conventional injector 10 of FIG. 2. It is recognized that other embodiments are still possible, resulting in an even further optimization of the reduction in unheated volume, when the geometry of this housing 50 is modified. One such modification of the housing 50' is shown in FIG. 5, compared with the conventional housing 50 of the RDU 10' shown in FIG. 6. Thus, instead of having the tapered portion 52, as does the housing 50 of FIG. 6, the housing 50' includes a portion 52' that extends transversely with respect to the longitudinal axis B of the injector 10' and is disposed adjacent to an end 54 of the coil heater 13' that is generally adjacent to the fluid outlet 16. This permits the end 54 of the coil heater 13' to be moved further toward the metering point 16 as compared to end 54' of the heater coil 13' of FIG. 6 and thereby heat even more of the volume of fluid in the inlet tube 16.

Implementation of these embodiments is expected to reduce the time to injection of hot fluid into the exhaust, with a resultant reduction in cold start NOx emissions.

Although urea solution has been disclosed as the reducing agent 32, it can be appreciated that other reducing agents can be used such as Guanidinium Formate, since the agent is now heated upon injection.

Although the RDU 10' is disclosed for use in an a SCR system, the RDU 10' can be employed in a lean NOx trap (LNT) system as well, where the reducing agent is diesel fuel (a hydrocarbon-based fuel).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reductant delivery unit for reducing nitrogen oxide (NOx) emissions from a vehicle, the reductant delivery unit comprising:
   a solenoid operated fluid injector having a fluid inlet and a fluid outlet, the fluid inlet being constructed and arranged to receive a reducing agent from a source of reducing agent and the fluid outlet being constructed and arranged to communicate with an exhaust gas flow path of the vehicle so that the fluid injector controls injection of the reducing agent into the exhaust gas flow path, the fluid injector having an inlet tube for directing the reducing agent between the fluid inlet and the fluid outlet,
   a coil heater integral with the fluid injector and constructed and arranged, when energized, to inductively heat the inlet tube to thereby heat the reducing agent within the inlet tube,
   a coil heater housing surrounding at least a portion of the coil heater,
   an overmold structure overmolding the coil heater housing, the overmold structure contacting and covering an outer surface of the coil heater housing, and
   an injector housing covering at least a portion of the overmold structure and constructed and arranged to be in sealing relation with the overmold structure, absent an O-ring.

2. The delivery unit of claim 1, further comprising a flange constructed and arranged to mount the fluid injector to the exhaust gas flow path, the flange surrounding at least a portion of the injector housing.

3. The delivery unit of claim 1, wherein the coil heater housing includes a portion extending transversely with respect to a longitudinal axis of the fluid injector and adjacent to a longitudinal end of the coil heater, the portion of the coil heater housing being a longitudinal end of the coil heater housing.

4. The delivery unit of claim 1, in combination with the source of reducing agent feeding the fluid inlet.

5. The delivery unit of claim 4, wherein the reducing agent is urea solution.

6. The delivery unit of claim 4, wherein the reducing agent is Guanidinium Formate.

7. The delivery unit of claim 4, wherein the reducing agent is a hydrocarbon-based fuel.

8. The delivery unit of claim 1, wherein the overmold structure extends along a longitudinal axis of the fluid injector so that a most upstream portion of the overmold structure is disposed further upstream than a most upstream portion of the coil heater housing, and a most downstream portion of the overmold structure is disposed further downstream than a most downstream portion of the coil heater housing.

9. The delivery unit of claim 1, wherein the overmold structure contacts and covers a portion of the coil heater housing which surrounds a laterally outermost portion of the coil heater.

10. A reductant delivery unit for reducing nitrogen oxide (NOx) emissions from a vehicle, the reductant delivery unit comprising:
    a solenoid operated fluid injector having a fluid inlet and a fluid outlet, the fluid inlet being constructed and arranged to receive a reducing agent from a source of reducing agent and the fluid outlet being constructed and arranged to communicate with an exhaust gas flow path of the vehicle so that the fluid injector controls injection of the reducing agent into the exhaust gas flow path, the fluid injector having an inlet tube for directing the reducing agent between the fluid inlet and the fluid outlet,
    a coil heater integral with the fluid injector and constructed and arranged, when energized, to inductively heat the inlet tube and thus at least a portion of the reducing agent therein so that a most downstream volume of the inlet tube which is downstream of a volume of the inlet tube that is laterally adjacent a most downstream end of the coil heater, and which is immediately upstream of the fluid outlet, is less than about 100 mm$^3$,
    a coil heater housing surrounding a portion of the coil heater,
    an overmold structure overmolding the coil heater housing, the overmold structure contacting and covering an outer surface of the coil heater housing, and
    an injector housing covering at least a portion of the overmold structure and constructed and arranged to be in sealing relation with the overmold structure, absent an O-ring.

11. The delivery unit of claim 10, further comprising a flange constructed and arranged to mount the fluid injector to the exhaust gas flow path, the flange surrounding at least a portion of the injector housing.

12. The delivery unit of claim 10, wherein the coil heater housing includes a portion extending transversely with respect to a longitudinal axis of the fluid injector and adjacent to a longitudinal end of the coil heater, the portion of the coil heater housing being a longitudinal end thereof.

13. A method of reducing nitrogen oxide (NOx) emissions from a vehicle, the method comprising the steps of:
   associating a solenoid operated fluid injector with an exhaust gas flow path, the fluid injector having a fluid inlet and a fluid outlet, the fluid inlet receiving a reducing agent from a source of reducing agent, the fluid outlet communicating with the exhaust gas flow path, the fluid injector having an inlet tube for directing the reducing agent between the fluid inlet and the fluid outlet,
   heating, with a heater of the fluid injector, at least a portion of the reducing agent while within the inlet tube so that a volume of the reducing agent in the inlet tube which is downstream of a volume of the reducing agent that is laterally adjacent to a most downstream end of the heater, and which is upstream of the fluid outlet, is less than about 100 $mm^3$; and
   operating the fluid injector to inject the reducing agent into the exhaust gas flow path,
   wherein the fluid injector includes a coil heater and the step of heating the reducing agent includes energizing the coil heater to inductively heat the inlet tube to thereby heat the reducing agent within the inlet tube,
   wherein the fluid injector includes a coil heater housing surrounding a portion of the coil heater, an overmold structure overmolding the coil heater housing, and an injector housing covering at least a portion of the overmold structure, the method further including:
   sealing the injector housing with the overmold structure, absent an O-ring.

14. The method of claim 13, wherein the coil heater housing includes a portion extending transversely with respect to a longitudinal axis of the fluid injector and adjacent to a longitudinal end of the coil heater, the portion being a longitudinal end of the coil heater housing.

15. The method of claim 13, wherein the associating step includes using a flange to mount the injector to the exhaust gas flow path and surrounding at least a portion of the injector housing.

16. The method of claim 13, wherein the reducing agent is urea solution.

17. The method of claim 13, wherein the reducing agent is Guanidinium Formate.

18. The method of claim 13, wherein the reducing agent is a hydrocarbon-based fuel.

* * * * *